United States Patent
Hill et al.

(10) Patent No.: US 8,850,329 B1
(45) Date of Patent: Sep. 30, 2014

(54) TAGGED BROWSING HISTORY INTERFACE

(71) Applicant: Amazon Technologies, Inc., Reno, NV (US)

(72) Inventors: Peter Frank Hill, Seattle, WA (US); Brett Richard Taylor, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/662,320

(22) Filed: Oct. 26, 2012

(51) Int. Cl.
G06F 3/00 (2006.01)
G06F 17/30 (2006.01)

(52) U.S. Cl.
CPC .............................. G06F 17/30017 (2013.01)
USPC ............................ 715/745; 715/738; 715/760

(58) Field of Classification Search
CPC ................................................ G06F 17/30017
USPC ........................................... 715/738, 745, 760
See application file for complete search history.

(56) References Cited

U.S. PATENT DOCUMENTS 7,424,476 B2 * 9/2008 Apparao et al. ...................... 1/1
7,669,136 B1 * 2/2010 Gaware et al. ................ 715/760

* cited by examiner

Primary Examiner — Andrey Belousov
(74) Attorney, Agent, or Firm — Kilpatrick Townsend & Stockton, LLP

(57) ABSTRACT

Embodiments of the present disclosure are directed to, among other things, managing browsing histories based at least in part on metadata and/or tags associated with a web request. In some examples, a web service may collect metadata associated with the web request. Based at least in part on the collected metadata, content tags associated with the web request may be identified. Additionally, in some examples, one or more browsing metrics may be generated. The browsing metric may be configured to identify at least a web request characteristic to be compared with a second web request characteristic.

23 Claims, 9 Drawing Sheets

TAGGED BROWSING HISTORY INTERFACE

BACKGROUND

As web content continues to grow, so does the number of consumers and the number and type of sources. Numerous different web sites on the Internet now provide digital content, such as news, books, music, services, mail-order products, etc. Additionally, for many types of content, such as the news, the Internet may be becoming the most prevalent source. For example, some newspapers and magazines have stopped printing and are now only available over the web. In some instances, users may spend large amounts of each day searching the web for content, (e.g., reading articles, shopping, posting pictures, etc.). However, especially with the amount of content available over the web, managing historical browsing information associated with such web surfing has presented some challenges. In some cases, only content information associated with the web surfing may be available. However, this content information may provide only limited insight into a user's web browsing habits.

BRIEF DESCRIPTION OF THE DRAWINGS

Various embodiments in accordance with the present disclosure will be described with reference to the drawings, in which.

DETAILED DESCRIPTION

Figure 1:
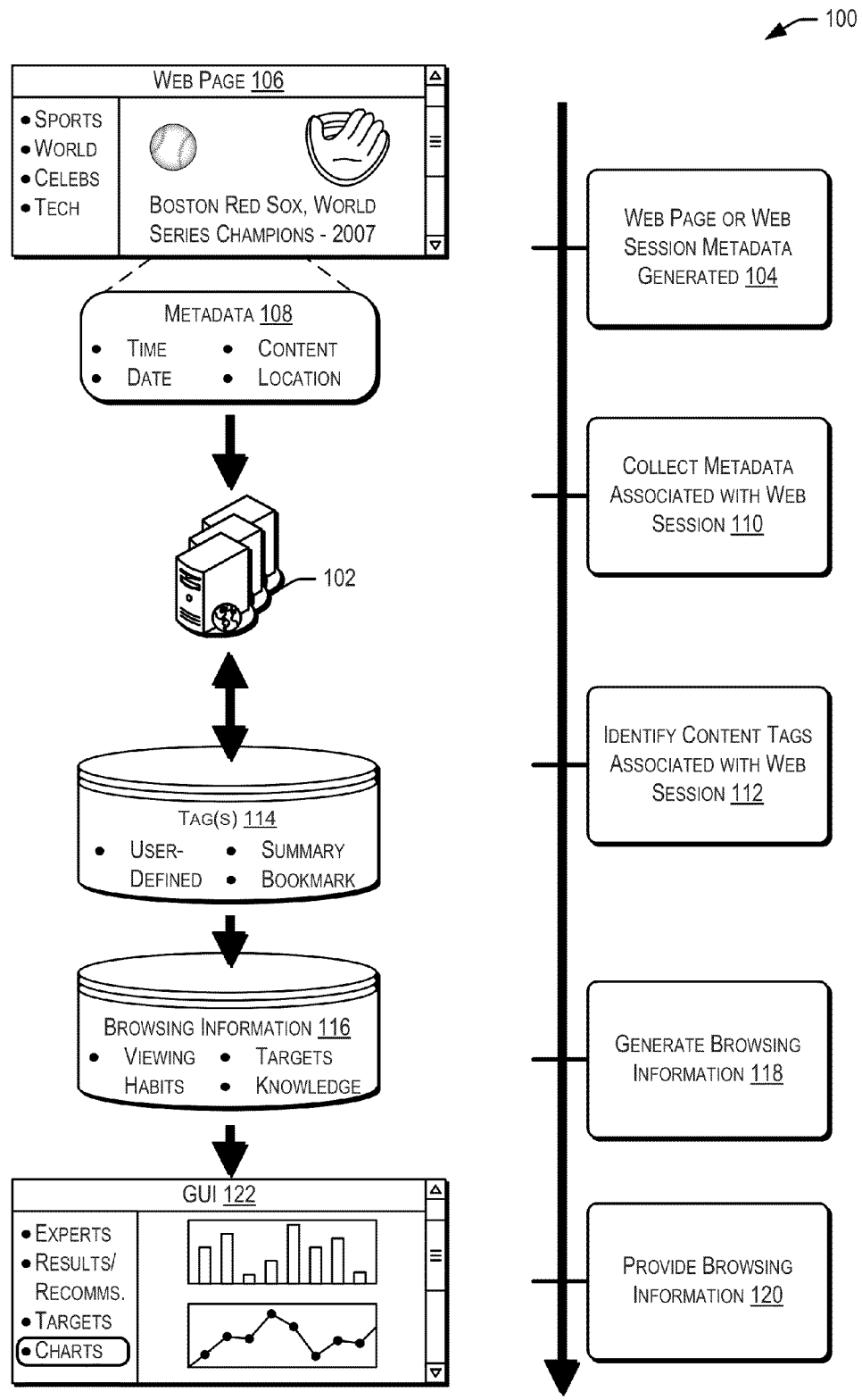
FIG. 1 illustrates an example flow for implementing a tagged browsing history interface, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing metadata tags associated with browsing requests and/or browsing sessions. In some examples, these metadata tags may be content tags that are generated based at least in part on web page content and/or contextual information associated with the web page or the request for the web page. Additionally, in some examples, the metadata tags may be received from or otherwise collected from a web browser and/or a user associated with the web browser. Further, in some aspects, the metadata may be utilized to generate and/or provide information about browsing behaviors and/or habits, browsing goals and/or targets, levels of user expertise and/or authority, product recommendations, and/or web searches. In some examples, the information may be provided as a graphical representation that may be displayed via a graphical user interface (GUI) or other user interface (UI) for displaying content to a user.

Additionally, embodiments of the present disclosure may also be directed to, among other things, monitoring browsing sessions in a contextually aware manner. In this way, contextual information associated with each web session (i.e., a collection of any number of web requests, including a single web request) may be collected and/or managed. This contextual information may then be utilized to generate tags that may be utilized to generate and/or provide browsing history information to the users.

In some aspects, web page content information may include text from the web page including, but not limited to, a title, a uniform resource locator (URL), headings, metadata, content text, etc. Additionally, in some aspects, the content information may include images from the web page and/or other information associated with the content of the web page. By way of example only, for a web page discussing the 2007 Boston Red Sox, content information may include "Boston," "Red Sox," "baseball," "World Series," "sports," etc. Additionally, those content terms may be content or metadata tags associated with the web page, as desired. As used herein, a tag may be any metadata or other data in the form of text or other identifier that can be associated with a web page or a web session. For example, the metadata may include summary information defined by a collection of other metadata, user-defined tags, and/or bookmarks provided by the user. A web session, as used herein, may define any grouping of web requests or web page views within a particular period of time (or a single web request at a particular time, location, and/or associated with a particular device). For example, a web session may cover an entire day, a particular range of time during a day, web requests made at a particular location, by a particular user, and/or utilizing a particular device, a web-state session defined by log-in information or the like, etc.

In some aspects, contextual information may include information other than content information that may inform or help infer additional information about the web page or web session. For example, contextual information may include, but is not limited to, a time of day associated with the web page or session, an amount of time associated with the web page or session, a date associated with the web page or session, a location of the browser associated with the web page or session, and/or a search term associated with the web page or session. Additionally, in some examples, the contextual information may be determined based at least in part on when the web page was viewed and/or where the user (i.e., the web browser or computing device implementing the web browser) is located while viewing the web page or during the web session.

By way of example only, a user may request a web page via a web browser. Based at least in part on this request a web page may be provided or search results may be provided. In either case, contextual information and/or content information may be collected about the web page and/or subsequent web pages (e.g., of a single web session). The contextual information, the content information, and/or user-defined tags may be combined or selected individually to generate a content tag to be associated with the web page or the web session. Content tags may then be stored and/or managed in such a way that browsing history statistics, metrics, and/or other information may be generated therefrom.

Browsing history statistics may then be provided for display via a GUI in the form of time views, content views, location views, etc. Time views may provide browsing history information for a particular time or date (e.g., a number or type of pages viewed during a particular time or date). Content views may provide browsing history information related to particular content (e.g., statistics about web pages viewed related to particular types of content). Location views may provide browsing history information associated with web content viewed while the user was at a particular location (e.g., web pages viewed while browsing at the pier).

Additionally, in some aspects, charts (e.g., pie charts, histograms, bar charts, line charts, etc.) or other data structures (trees, graphs, etc.) may be provided to represent different views of browsing history information. For example, a histogram describing amounts of each type of content viewed during a web session (or temporal grouping of web requests), at a location, on a particular date, at a particular time, during a particular timeframe, utilizing a particular device, etc., may be generated based at least in part on the content tags for each web page visited during a web session. Additionally, the content tags may be utilized to determine how much time a user is spending on the web viewing pages associated with research, professional development (e.g., web pages that are enriching or related to one's profession or goals), entertainment, or the like. For example, a user may wish to evaluate how much time they (or another user) spends working versus playing on the web.

In addition, in some examples, the content tags may be utilized to determine a level of authority to be assigned to one or more users based on an amount of content viewed by each user. The content tags may also be utilized to enhance search results in response to a search query, enhance product recommendations in response to a product search or on a web page configured to display product recommendations, provide similarity scores between users (e.g., in a social media or dating site), and/or provide attained amounts (e.g., a percentage or other portion) of goals or targets for web content consumption (e.g., a user may wish to view less web pages associated with celebrity gossip and may set a goal of two web pages per day). Further, content tags may also be utilized to track how much browsing is conducted on each of a user's devices. For example, a user may wish to evaluate which devices they use for browsing more than others. This information may be useful for budgetary and/or financial decisions regarding device purchases, upgrades, and/or service plans. Content tags may also be utilized to discover and/or expose web content associated with known or determined experts in fields or categories associated with the tags. For example, a tag (which may, as noted, be based at least in part on content associated with web requests of a user) may indicate that the user is interested in randonneuring bicycles. As such, the content tags may inform the systems determination of one or more blogs, articles, or authors that have substantial amounts of rando content.

FIG. 1 depicts an illustrative flow 100 in which techniques for the management of tags associated with browsing requests may be implemented. These techniques are described in more detail below in connection with FIGS. 2-8. Returning to FIG. 1, in illustrative flow 100, operations may be performed by one or more processors of one or more browsing history management computers 102 and/or instructions for performing the operations may be stored in one or more memories of the browsing history management computers 102. As desired, the flow 100 may begin at 104, where web page and/or web session metadata may be generated and/or collected via a web page 106. In one non-limiting example, the web page 106 may be a news site configured to provide news or data about particular categories. By way of example only, the web page 106 is illustrated as providing categories including, but not limited to, sports news, world news, celebrity news, and/or technology news. When a user selects the sports category, a request may be sent to a web server configured to provide the news for the web page 106. In response to the request, the web page 106 may be transmitted to the user's computing device to display the Boston Red Sox information (e.g., including historical data about the baseball team and/or photos/images associated with the content). Additionally, in some examples, metadata 108 that is associated with the web page 106 may be collected. As noted above, the metadata 108 may include, but is not limited to, time information associated with the web page 106 (e.g., at what time the web page 106 was received and/or for how long the web page 106 was viewed), date information associated with the web page 106, content information associated with the web page 106 (e.g., baseball, Boston, Red Sox, World Series champions, etc.), and/or location information associated with the web page 106 (e.g., where the user and/or computing device was physically located when the web page 106 was received).

In some examples, the browsing history management computers 102 may collect the metadata 108 associated with the web page 106 and/or a web session associated with the web page 106 at 110. Collection of the metadata 108 may include receipt of the metadata from the web browser or a computing device associated with the web browser and/or may include storage of the metadata in a memory device of the browsing history management computers 102. At 112, the browsing history management computers may identify one or more content tags 114 associated with the web page 106 and/or a web session associated with the web page 106. The tags 114 may include, but are not limited to, user-defined tags (e.g., annotations or notes about the web page 106), summary tags generated based at least in part on combinations of the collected metadata 108 (e.g., using machine learning or other computer-executable algorithm), and/or bookmarks (e.g., provided by a user). In some examples, the browsing history management computers 102 may also generate browsing history information 116 at 118. As noted, browsing history information may include, but is not limited to, viewing habit information, goal and/or target attainment information, relative knowledge or expertise of other users, and/or information to be utilized to provide or rank search results, product recommendations, and/or similarities among other users. The flow 100 may end at 120, where the browsing history management computers 102 may provide the browsing information 116. In some examples, the browsing information 116 may be provided to a GUI 122 or for display by a GUI 122. As such, the browsing information 116 may be provided in such a way that it may be graphically represented and/or displayed to a requesting user.

Figure 2:
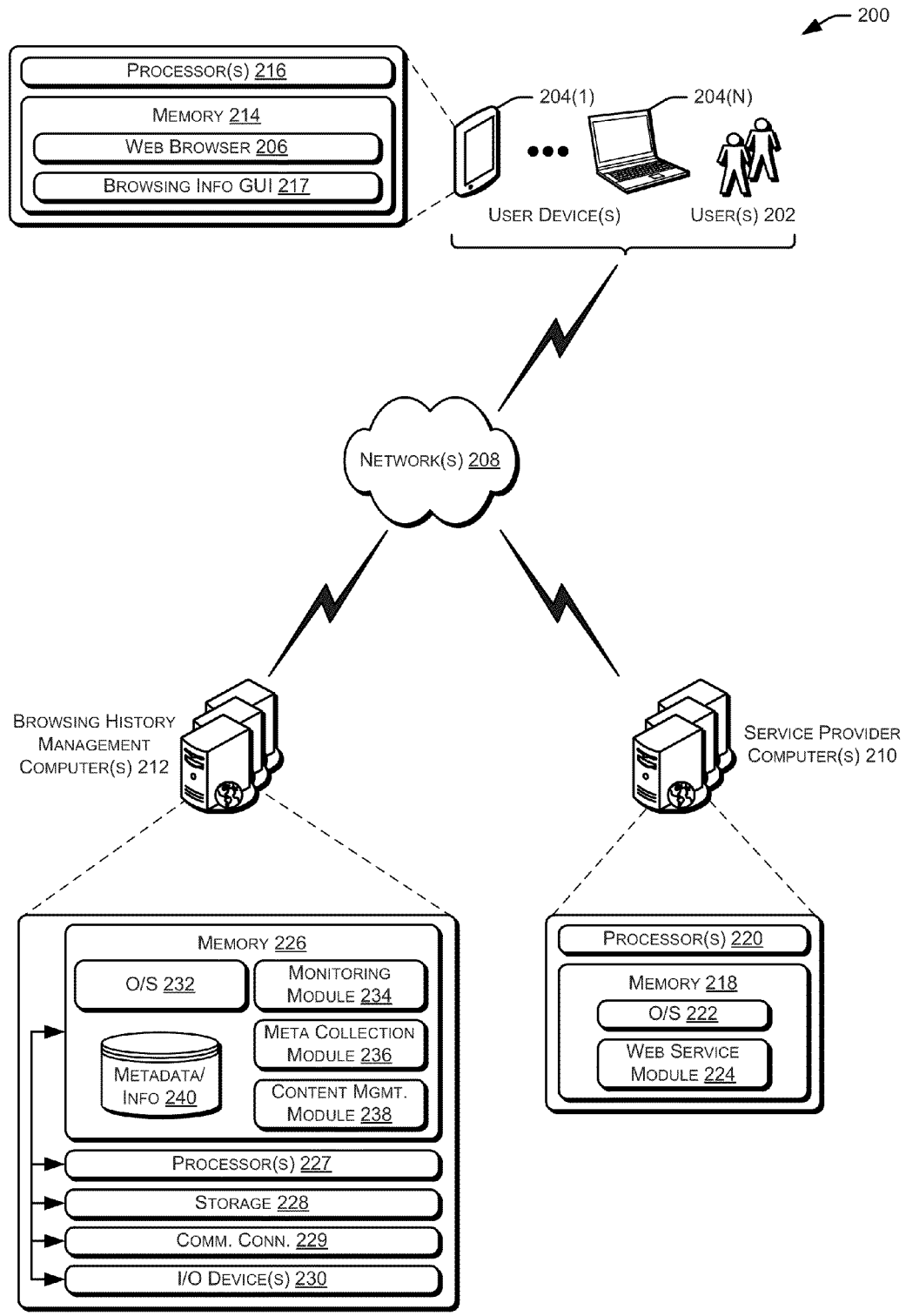
FIG. 2 illustrates an example architecture for implementing the tagged browsing history described herein that includes a browsing history management computer, a service provider computer, and/or one or more user devices connected via one or more networks, according to at least one example.

FIG. 2 depicts an illustrative system or architecture 200 in which techniques for managing browsing history tags may be implemented. In architecture 200, one or more users 202 (i.e., account holders or web browser users) may utilize user computing devices 204(1)-(N) (collectively, user devices 204) to access a web browser application 206, or a user account accessible through the web browser application 206, via one or more networks 208. In some aspects, the web browser application 206 and/or user account may be hosted, managed, and/or provided by a computing resources service or service provider, such as by utilizing one or more service provider computers 210 and/or one or more browsing history management computers 211. The one or more service provider computers 210 may, in some examples, provide computing resources such as, but not limited to, client entities, low latency data storage, durable data storage, data access, management, virtualization, etc. In some aspects, a client entity may be deployed and/or managed virtually and/or data volumes may be stored virtually within a distributed computing system operated by the one or more service provider computers 210. The one or more service provider computers 210 may also be operable to provide web hosting, computer application development and/or implementation platforms, combinations of the foregoing, or the like to the one or more users 202. The one or more browsing history management computers 211, in some examples, may provide browsing history management and/or browsing history statistics as a third-party service to the service provider computers 210. However, in some examples, the browsing history management computers 211 may be fully integrated with the service provider computers 210 such that they are controlled, managed, or otherwise operated by the same entity.

In some examples, the networks 208 may include any one or a combination of many different types of networks, such as cable networks, the Internet, wireless networks, cellular networks and other private and/or public networks. While the illustrated example represents the users 202 accessing the web browser application 206 over the networks 208, the described techniques may equally apply in instances where the users 202 interact with a service provider computer 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web browser application 206 may allow the users 202 to interact with a service provider computer 210, such as to access web content (e.g., web pages, music, video, etc.). The one or more service provider computers 210, perhaps arranged in a cluster of servers or as a server farm, may host the web browser application 206. Other server architectures may also be used to host the web browser application 206. The web browser application 206 may be capable of handling requests from many users 202 and serving, in response, various user interfaces that can be rendered at the user devices 204 such as, but not limited to the browsing info GUI 212. The web browser application 206 can provide any type of website that supports user interaction, including social networking sites, online retailers, informational sites, blog sites, search engine sites, news and entertainment sites and so forth. As discussed above, the described techniques can similarly be implemented outside of the web browser application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 210 and/or the browsing history management computers 211 via the networks 208, or via other network connections. While the following description may regularly refer to interaction between the user devices 204 and the service provider computers 210, it is to be understood that any communication to or from the user devices 204 may be via either (or both) of the service provider computers 210 or the browsing history management computers 211.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the browsing info GUI 212, such as web browsers or dedicated applications (e.g., smart phone applications, tablet applications, etc.) and/or the web browser application 206. The browsing info GUI 212 may be configured to receive, store and/or display a website or other interface for interacting with the service provider computers 210 and/or the browsing history management computers 211. Additionally, the memory 214 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

Additionally, in some aspects, the browsing info GUI 212 may allow a user 202 to view graphical representations of their browsing histories (e.g., as collected by the browsing history management computers 212). As such, the browsing info GUI 212 may be configured to receive data associated with the user's 202 browsing history from the browsing history management computers 212 or from the service provider computers 210. If the latter, the service provider computers 210 may first receive the browsing history data from the browsing history management computers 212. Alternatively, as noted, the service provider computers 210 and the browsing history management computers 212 may be integrated into a single computing system (e.g., a distributed system); in which case, the browsing history data may come from either or both computing systems. Further, the graphical representations of browsing history associated with the users 202 may include any variety of data structure or visual interpretation known in the art, as appropriate. For example, histograms, pie charts or the like may be provided. Fuel gauge or other speed related graphics may be used indicate levels, amounts, percentages, etc. of goals or targets. For example, a speedometer-type graphic may indicate a user's 202 goal of only reading two hours of sports news per day. Thus, the range of the speedometer may, in some examples, read from zero to two hours (or more than two hours), and the dial may indicate how many for how many minutes that user 202 has already viewed sports news that day. When the goal is reached (i.e., the dial reaches the line on the gauge that indicates the goal), the user 202 may be able to visual this via the graphical representation presented via the browsing info GUI 212. Other graphical reorientations are envisioned and will be described with reference to at least FIGS. 3 and 4.

In some aspects, the service provider computers 210 may also be any type of computing devices such as, but not limited to, mobile, desktop, thin-client and/or cloud computing devices, such as servers. In some examples, the service provider computers 210 may be in communication with the user devices 204 and/or the browsing history management computers 212 via the networks 208, or via other network connections. The service provider computers 210 may include one or more servers, perhaps arranged in a cluster, as a server farm, or as individual servers not associated with one another. These servers may be configured to host a website (or combination of websites) viewable via the user devices 204 or a web browser accessible by a user 202. Additionally, in some aspects, the service provider computers 210 may be configured to perform browsing history management as part of an integrated, distributed computing environment.

In one illustrative configuration, the service provider computers 210 may include at least one memory 218 and one or more processing units (or processor(s)) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described.

The memory 218 may store program instructions that are loadable and executable on the processor(s) 220, as well as data generated during the execution of these programs. Depending on the configuration and type of service provider computers 210, the memory 218 may be volatile (such as RAM) and/or non-volatile (such as ROM, flash memory, etc.). The service provider computers 210 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM or ROM.

The memory 218 and the additional storage, both removable and non-removable, are all examples of computer-readable storage media. Additional types of computer storage media that may be present in the service provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable storage media.

The service provider computers 210 may also contain communications connection(s) that allow the service provider computers 210 to communicate with a stored database, another computing device or server, user terminals and/or other devices on the networks 208. The service provider computers 210 may also include input/output (I/O) device(s), such as a keyboard, a mouse, a pen, a voice input device, a touch input device, a display, speakers, a printer, etc.

Turning to the contents of the memory 218 in more detail, the memory 218 may include an operating system 222 and one or more application programs or services for implementing the features disclosed herein including a web service module 224. The web service module 224 may be configured to provide one or more web services including, but not limited to, one or more web sites.

In some examples, the web service module 224 may be configured to receive web page requests and provide, in response web pages and/or web content to the web browser 206 of the user device 204 over the networks 208. In some cases, the web service module 224 may collect browsing history and/or contextual information associated with the web requests and sent web content. However, in other examples, such information may be collected by the browsing history management computers 212. Additionally, the web service module 224 may enable the users 202 to provide annotations, tags, and/or other information for identifying or otherwise tagging web pages. Contextual information collected by the web service module 224 may include, but is not limited to, the date the page was requested, the time of day the page was requested, how long the page was viewed, the location of the mobile device when the page was requested (e.g., determined by a geo-location device), the type of content of the web page, etc. This contextual information may then be stored in the memory 218 or in one or more memory devices 226 of the browsing history management computers 212.

Additionally, in some aspects, the browsing history management computers 212 may also be any type of computing devices such as, but not limited to, mobile, desktop, thin-client and/or cloud computing devices, such as servers. In some examples, the browsing history management computers 212 may be in communication with the user devices 204 and/or the service provider computers 210 via the networks 208, or via other network connections. The browsing history management computers 212 may include one or more servers, perhaps arranged in a cluster, as a server farm, or as individual servers not associated with one another. These servers may be configured to perform resource risk assessment as part of an integrated, distributed computing environment.

In one illustrative configuration, the browsing history management computers 212 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of browsing history management computers 212, the memory 226 may be volatile (such as RAM) and/or non-volatile (such as ROM, flash memory, etc.). The browsing history management computers 212 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the browsing history management computers 212 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the browsing history management computers 212. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The browsing history management computers 212 may also contain communications connection(s) 229 that allow the browsing history management computers 212 to communicate with a stored database, another computing device or server, user terminals and/or other devices on the networks 208. The browsing history management computers 212 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232, one or more data stores, and/or one or more application programs or services for implementing the features disclosed herein including a monitoring module 234, a metadata collection module 236, and/or a content management module 238. The one or more data stores may include a metadata and/or information data store 240 configured to store metadata and/or other information associated with web pages viewed by the users 202. The monitoring module 234 may be configured to monitor network activity between the user devices 204 (e.g., the web browser 206) and the service provider computers 210 (e.g., the web service module 224). For example, the monitoring module 234 may monitor web requests sent from the web browser 206 to the web service module 224. The monitoring module 234 may also monitor web pages sent to the web browser 206 as well as contextual information associated with the user devices 204 when the requests are made and/or the pages are transmitted. In some examples, this monitored information may be stored in the metadata/information data store 240.

In some examples, the metadata collection module 236 may be configured to collect the information monitored by the monitoring module 234 and associate the metadata with the web request and/or the web session. In this way, the metadata and/or tags provided by the users 202 may be linked with the web sessions for subsequent processing. For example, the metadata collection module 236 may associate the location of a user device 204 when a request is made with the web session associated with the web request. This metadata (which has been associated with the web session) may then be stored in the metadata/information data store with a notation or other indicator identifying that the metadata was collected during that particular web session. In some examples, multiple different pieces and/or types of metadata (i.e., the contextual information) may be associated with a single web session. For example, a web session and/or particular web request may have time, location, and duration metadata associated therewith.

Additionally, in some examples, the content management module 238 may be configured to manage the collected and/or saved contextual information. Additionally, the content management module 238 may also be configured to manage user-provided metadata such as, but not limited to, annotations, tags, bookmarks, etc., and/or computer-generated (e.g., machine learned) metadata such as, but not limited to, summary tags, automatically determined tags, etc. In some aspects, the content management module 238 may also manage the stored metadata to generate browsing history information, prepare such browsing history information in a graphical form, and/or provide the graphical representation and/or the metadata itself to the browsing information GUI 212 via the networks 208. For example, the content management module 238 may determine a search results order or a recommendation for a user 202 based at least in part on the metadata stored in the metadata/information data store 240. Additionally, in some examples, the content management module 238 may determine or identify other users of the web service module 224 with similar browsing histories, may prepare or provide charts or graphs representing a user's 202 browsing history over time, may determine an amount or percentage of a user-defined browsing goal that has been attained, and/or may determine relative experts and/or authorities within the system based at least in part on an amount of time or pages spent requesting or otherwise reviewing web pages of a certain topic or type of topic.

A few additional examples of the operations of the browsing history management computers 212 and/or the service provider computers 210 are also described in greater detail below with reference to FIGS. 3-8.

Figure 3:
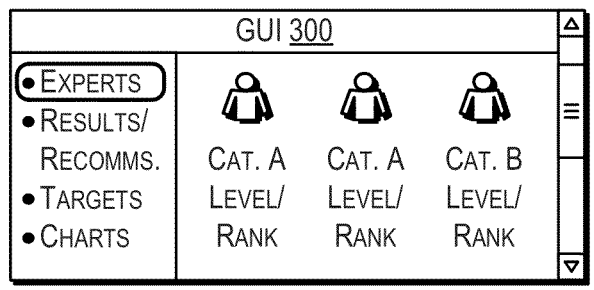
FIG. 3 illustrates two example graphical user interfaces for implementing the tagged browsing history interface described herein, according to at least one example.
Figure 3:
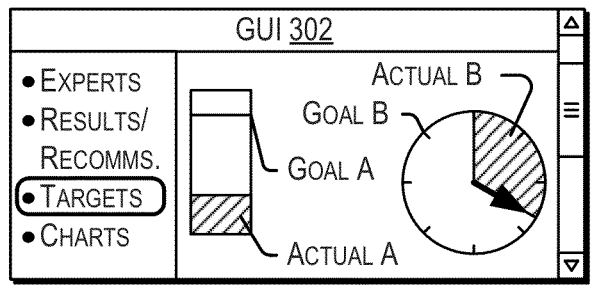

FIG. 3 depicts two example GUIs 300, 302 with which techniques for managing browsing history tags may be implemented. In each of these two example GUIs 300, 302, a user 202 (e.g., from FIG. 2) may request (e.g., via the web browser 206 and/or the browsing information GUI 212 of FIG. 2) historical browsing information. In either event, the browsing history management computers 212 may generate the appropriate historical browsing information, generate the GUIs 300, 302, and/or provide the GUIs 300, 302 to the web browser 206 and/or browsing information GUI 212 for display to the requesting user 202. In some examples, the GUI 300 may be generated and/or provided to the user 202 in response to a request for experts, a request for authoritative users, and/or a request to ask a question. Additionally, in some examples, the GUI 302 may be generated and/or provided to the user 202 in response to a request to track a goal or target and/or in response to a request to view a target or goal being tracked.

In some examples, the GUI 300 may be configured to display experts and/or authoritative users based at least in part on historical browsing information and/or tags. Additionally, the GUI 300 may indicate experts or users (possibly including the user 202) with a certain level of authority in a particular category. For example, and without limitation, a user 202 may request to see a list of the top users that have been identified as experts in the automotive reviewing category. Based at least in part on metadata and/or tags associated with browsing histories of each user of the service provider computers 210 of FIG. 2, the browsing history management computers 212 may attribute certain levels and/or ranks to each user of the system in each of a set of categories. For example, automotive reviewing may be a particular category and may describe users 202 that write reviews of automobiles. As users 202 browse the web pages of the service provider computers 210 (or other service providers or other web sites), contextual information may be collected. As such, as first user may write or review more automobile reviews than any other users. This first user may then be identified as an expert (at least relative to other users) in this category. This user may be granted a higher level or rank in this category than all other users. The GUI 300 may, in some examples, display this information. However, in some examples, users will be given the opportunity to opt out or otherwise not be included in this service. In this way, only users that agree (or at least don't disagree) to have their personal information shared will be shown in GUI 300. Alternatively, or in addition, in some examples, no personal information may be displayed in GUI 300, and instead, a non-identifying alias may be provided. The user 202 requesting to find this expert may then be given the opportunity to send a message to or ask a question of the expert. Additionally, in some examples, this process and/or GUI 300 may be provided in response to a request to ask a question, as opposed to in response to a request to identify an expert.

In some examples, the GUI 302 may be configured to display targets and/or goals based at least in part on historical browsing information and/or tags. Additionally, the GUI 302 may indicate one or more charts, graphs, or other graphical representations (e.g., a data structure) that indicates a level, amount, or percentage of a user-defined goal or target. For example, and without limitation, a user 202 may set a goal or target associated with a certain amount of web browsing that they wish to be involved in. Such goals may be completely arbitrary or they may be based at least in part on current historical browsing information associated with the user. For example, a user may wish to reduce their celebrity news web page viewing by a 10%. In this example, a graphical representation may be generated that shows their current amount of celebrity news viewing (e.g., the entire column shown in the middle of GUI 302), their "goal A" (e.g., 90% of the entire column) target, and the "actual A" amount of celebrity news viewing (e.g., that has occurred since setting the target). The GUI 302 may then be generated and/or provided based at least in part on a request to view the target and/or attained amounts. Alternatively, or in addition, "goal B" and "actual B" values may be displayed as a speedometer-type gauge and/or in any other graphical form (e.g., a pie chart or the like). The "actual A" and/or "actual B" values may be updated in real-time or near real-time such that the user 202 may see the BUI 302 change as additional web browsing occurs.

Figure 4:
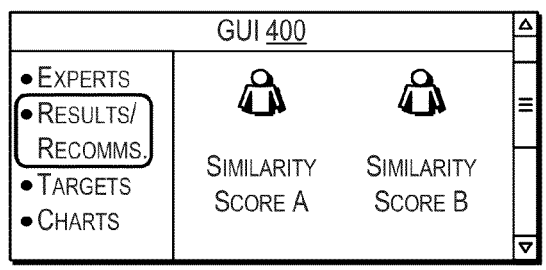
FIG. 4 illustrates three additional example graphical user interfaces for implementing the tagged browsing history interface described herein, according to at least one example.
Figure 4:
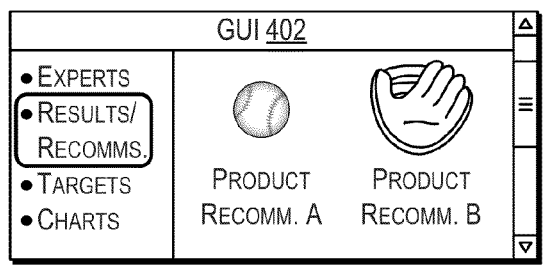
Figure 4:
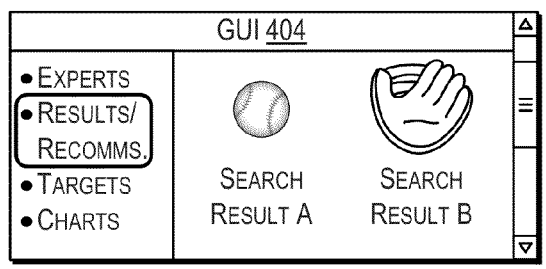

FIG. 4 depicts three example GUIs 400, 402, 404 with which techniques for managing browsing history tags may be implemented. In each of these three example GUIs 400, 402, 404 a user 202 (e.g., from FIG. 2) may request (e.g., via the web browser 206 and/or the browsing information GUI 212 of FIG. 2) historical browsing information. In either event, the browsing history management computers 212 may generate the appropriate historical browsing information, generate the GUIs 400, 402, 404, and/or provide the GUIs 400, 402, 404 to the web browser 206 and/or browsing information GUI 212 for display to the requesting user 202. In some examples, the GUI 400 may be generated and/or provided to the user 202 in response to a request for other users with similar browsing histories (e.g., as part of a social networking or dating web site, in order to ask questions about web pages or other web content, and/or in order to see trends or habits of other users). Additionally, in some examples, the GUI 402 may be generated and/or provided to the user 202 in response to a request to view or purchase a product and/or as a recommendation without first receiving a request from the user 202 (e.g., on a home screen or recommendation portion of a web page). Further, in some examples, the GUI 404 may be generated and/or provided to the user 202 in response to a search request (e.g., via a search engine of the web browser 206 and/or a local search engine within a web site and/or a computing system).

In some examples, the GUI 400 may be configured to display results and/or recommendations based at least in part on historical browsing information and/or tags. Additionally, the GUI 400 may indicate one or more users of the service provider computers 210 (or other computing system) that may have similar browsing habits. For example, and without limitation, a first user 202 may regularly search for and/or request web pages associated with the Boston Red Sox. This user 202 may then request to see other users that similarly search for and/or request web pages associated with the Boston Red Sox. In some examples, as noted above, users may have to opt in (or not opt out) of this service in order for their names or aliases to be provided. However, assuming every user (or a subset of all users) has opted in, the user 202 may be able to see a list of users and their associated similarity scores (e.g., "similarity score A" and/or "similarity score B"). Similarity scores may be based on content and/or contextual information. For example, two users may have similar browsing habits based at least in part on their locations when the searches are requested and/or how long they view such pages (or the duration of time during which they request certain content).

In some examples, the GUI 402 may also be configured to display results and/or recommendations based at least in part on historical browsing information and/or tags. Additionally, the GUI 402 may indicate one or more product recommendations associated with products of the service provider computers 210 (or other computing system) that may be similar or otherwise related to the browsing history metadata and/or tags. For example, and without limitation, a user 202 may regularly search for and/or request web pages associated with the Florida Gators. In some examples, based at least in part on the metadata and/or tags associated with the user's 202 web sessions and/or web requests, the content management module 238 of FIG. 2 may determine products that may be related. As such, products related to the Florida Gators (e.g., apparel, national championship memorabilia, sporting event tickets, etc.) may be recommended. Additionally, in some examples products may also be recommended that are less directly related (e.g., general college football sports products, general college basketball sports products, other dual-national championship school products, baseball products, etc.). Additionally, in some aspects, other contextual information may be utilized to provide enhanced recommendations. For example, if the user 202 is located in Seattle during the web sessions that contain Florida Gator metadata and/or tags, the GUI 402 may provide recommendations for University of Washington related sports products and may not provide recommendations related to sporting event tickets unless they are close in geographic proximity. Similarity scores for products may be based on content and/or contextual information. For example, two products may have similar scores based at least in part on a correlation of metadata and/or tags.

In some examples, the GUI 404 may also be configured to display results and/or recommendations based at least in part on historical browsing information and/or tags. Additionally, the GUI 404 may indicate one or more search results for products of the service provider computers 210 (or other computing system) and/or web content accessible by the service provider computers 210 (or other computing system). For example, and without limitation, a first user 202 may regularly search for and/or request web pages associated with President Obama. This user 202 may then enter a search query for products and/or other web content. In some examples, the search results may be weighted or otherwise ranked based at least in part on browsing history metadata and/or tags. For example, for this particular user, the search results may be weighted such that only search results are provided that are related to President Obama, the Democratic Party, the 2012 elections, etc. Similarity scores may be placed on each search result, and based at least in part on content and/or contextual information, the similarity scores may be utilized to rank or determine which results to provide, as desired.

FIGS. 5-8 illustrate example flow diagrams showing respective processes 500-800 for managing metadata and/or tags associated with browsing history information. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 5:
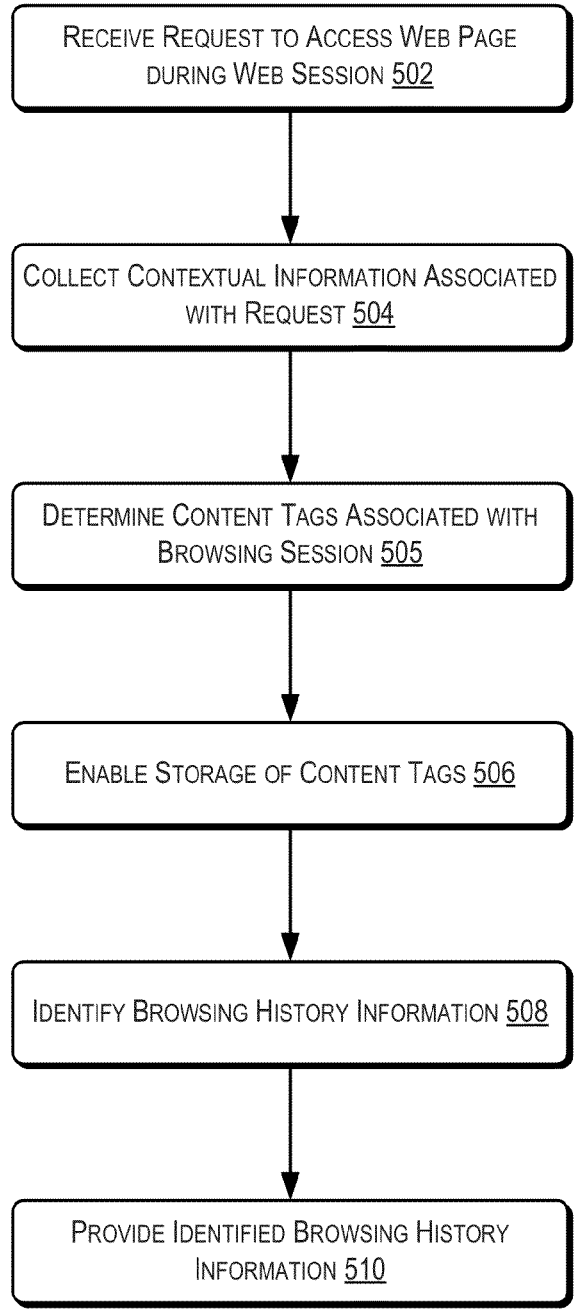
FIG. 5 illustrates an example flow diagram of a process for implementing the tagged browsing history interface described herein, according to at least one example.

In some examples, the one or more browsing history management computers 212 (e.g., utilizing at least one of the monitoring module 234, the metadata collection module 236, and/or the content management module 238) shown in FIG. 2 may perform the process 500 of FIG. 5. The process 500 may begin by including receiving a request to access a web page during a web session at 702. In some aspects a web session may be defined as a particular period of time in which web requests are made by a user device, received by the user device, and/or displayed on a GUI of the user device. Additionally, the web request may receive by a web server or other service provider configured to provide web content. At 504, the process 500 may include collecting contextual information associated with the web request. For example, the metadata collection module 236 of FIG. 2 may be configured to collect date, time, and/or location information from the user device 204 of FIG. 2. This metadata may be based at least in part on the web session. The process 500 may also include determining content tags associated with the browsing session at 505. The content tags may be based at least in part on the collected metadata. Additionally, the content tags may be based at least in part on user-defined annotations, tags, and/or bookmarks. The content tags may also be computer-generated (e.g., based at least in part on machine learning, generated by combining the collected metadata to form a summary tag, etc.).

In some examples, the process 500 may include enabling storage of the content tags at 506. The content tags may be stored in a metadata/information data store 240 and/or a memory 218 of either or both of the browsing history management computers 212 or the service provider computers 210 of FIG. 2. At 508, the process 500 may include identifying browsing history information. In some examples, browsing history information may include information based at least in part on the content tags and/or the contextual information. For example, the browsing history information may include an amount or a percentage attained of a user-defined goal. The browsing history information may also include browsing habits over time, search results weighted by the tags, product recommendations weighted by the tags, expert users defined by the tags, similar users defined by the tags, etc. The process 500 may end at 510, where the process 500 may include providing the identified browsing history information (e.g., for display via a GUI or a computing device configured to display the browsing history information graphically).

Figure 6:
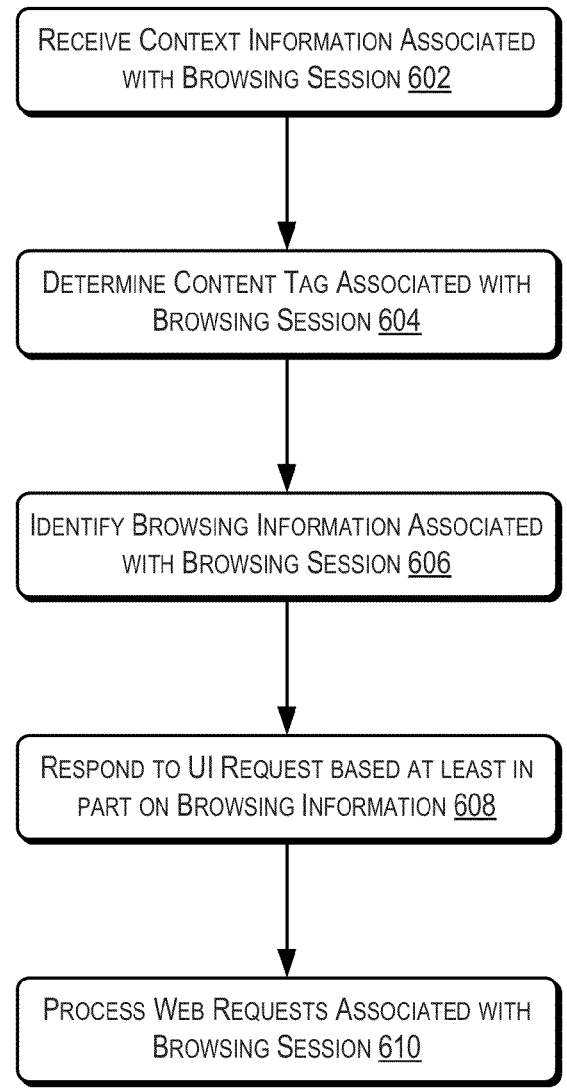
FIG. 6 illustrates another example flow diagram of a process for implementing the tagged browsing history interface described herein, according to at least one example.

FIG. 6 illustrates an example flow diagram showing process 600 for managing metadata and/or tags associated with browsing history information. The one or more browsing history management computers 212 (e.g., utilizing at least one of the monitoring module 234, the metadata collection module 236, and/or the content management module 238) shown in FIG. 2 may perform the process 600 of FIG. 6. The process 600 may begin by including receipt of context information associated with a browsing session at 602. At 604, the process 600 may include determining content tags associated with the browsing session. As noted above, determining the content tags may include automatically generating content tags based at least in part on context information and/or receiving content tags from the users. In some examples, the process 600 may include identifying browsing history information associated with the browsing session at 606. As noted above, this information may include a wide variety of data (e.g., in graphical form) that represents the content tags as applied to other web related information (e.g., search results, recommendations, social networking, dating web sites, personal goals, etc.). At 608, the process 600 may include responding to a UI request based at least in part on the browsing information. For example, a user may request a product recommendation (i.e., the UI request). As such, the process 600 may include responding to this product recommendation request by providing a product recommendation that is based at least in part on the content tags of that user over a particular period of time. The process 600 may end at 610, where the process 600 may include processing web requests associated with the browsing session. In other words, the process 600 may include cloud-type (i.e., distributed) processing, where the web browser of the user device merely makes requests and receives processed data to display. The bulk of the processing may be done by the process 600 as opposed to the web browser. In some examples, this may enable the ability to collect the metadata and/or the tags, since the process 600 may control each piece of data associated with each web request and/or each web session.

Figure 7:
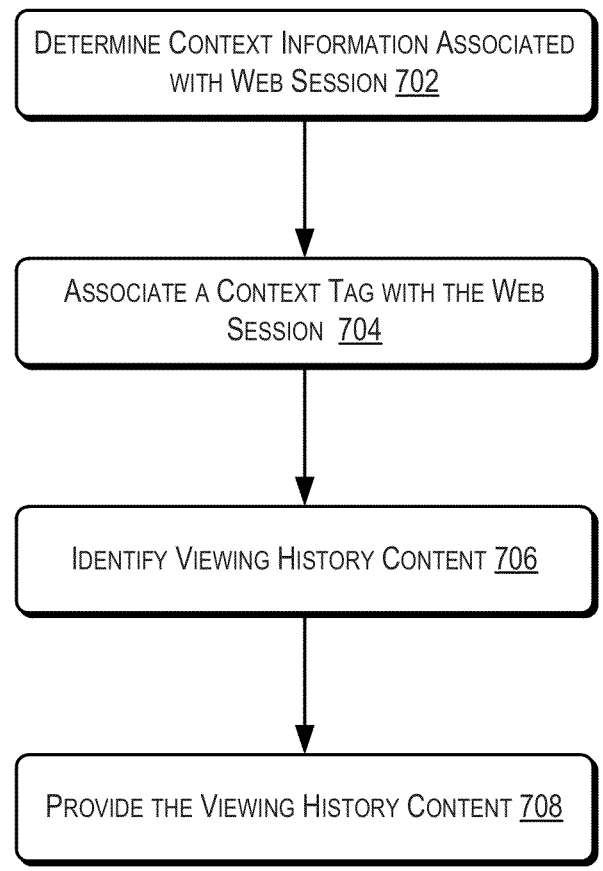
FIG. 7 illustrates another example flow diagram of a process for implementing the tagged browsing history interface described herein, according to at least one example.

FIG. 7 illustrates an example flow diagram showing process 700 for managing metadata and/or tags associated with browsing history information. The one or more browsing history management computers 212 (e.g., utilizing at least one of the monitoring module 234, the metadata collection module 236, and/or the content management module 238) shown in FIG. 2 may perform the process 700 of FIG. 7. The process 700 may begin by including a determination of context information associated with a web session at 702. At 704, the process 700 may include associating a context tag with the web session. In some cases, each content tag may be associated with a web session based at least in part on a header of the content tag or other identifier for associated the tag with the session. In some cases, many different tags may each be associated with a single web session. In some examples, the process 700 may include identifying viewing history content associated with the browsing session at 706. As noted above, this information may include a wide variety of data (e.g., in graphical form) that represents the content tags as applied to other web related information (e.g., search results, recommendations, social networking, dating web sites, personal goals, etc.). The process 700 may end at 708, where the process 700 may include providing the viewing history content. In some cases, providing the viewing history content includes preparing a graphical representation of the content and providing that representation to a GUI. However, in some cases, providing the content may include providing the data and enabling the GUI to generate the graphical representation.

Figure 8:
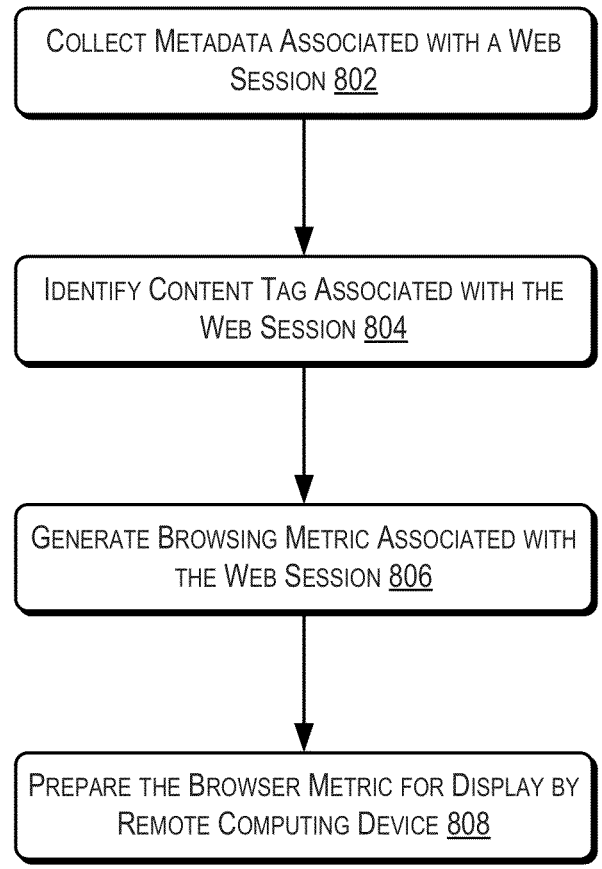
FIG. 8 illustrates another example flow diagram of a process for implementing the tagged browsing history interface described herein, according to at least one example.

FIG. 8 illustrates an example flow diagram showing process 800 for managing metadata and/or tags associated with browsing history information. The one or more browsing history management computers 212 (e.g., utilizing at least one of the monitoring module 234, the metadata collection module 236, and/or the content management module 238) shown in FIG. 2 may perform the process 800 of FIG. 8. The process 800 may begin by including collecting metadata associated with a web session at 802. The metadata may include the content information and/or contextual information. For example, the metadata may include the type of content, a word, phrase, or image from the content, and/or date, time, and/or location information associated with web session. At 804, the process 800 may include identifying content tags associated with the web session. In some aspects, this may include identifying the content tags based at least in part on the collected metadata. In some examples, the process 800 may include generating a browsing metric associated with the web session at 806. In some examples, the browsing metric may be configured to identify at least a web session characteristic to be compared with a second web session characteristic. For example, the first web session characteristic may include a user goal and the second web session characteristic may include an amount of the goal attained by the user. Other examples of web session characteristics may include, but are not limited to, search queries, search results, tags, product recommendations, similarity scores associated with other users, products, etc. The process 800 may end at 808, where the process 800 may include preparing the browser metric for display by a remote computing device. In some examples, this may include preparing a UI image or other graphical representation of the metric.

Illustrative methods and systems for managing metadata and/or tags associated with browsing history information are described above. Some or all of these systems and methods may, but need not, be implemented at least partially by architectures such as those shown at least in FIGS. 2-8 above.

Figure 9:
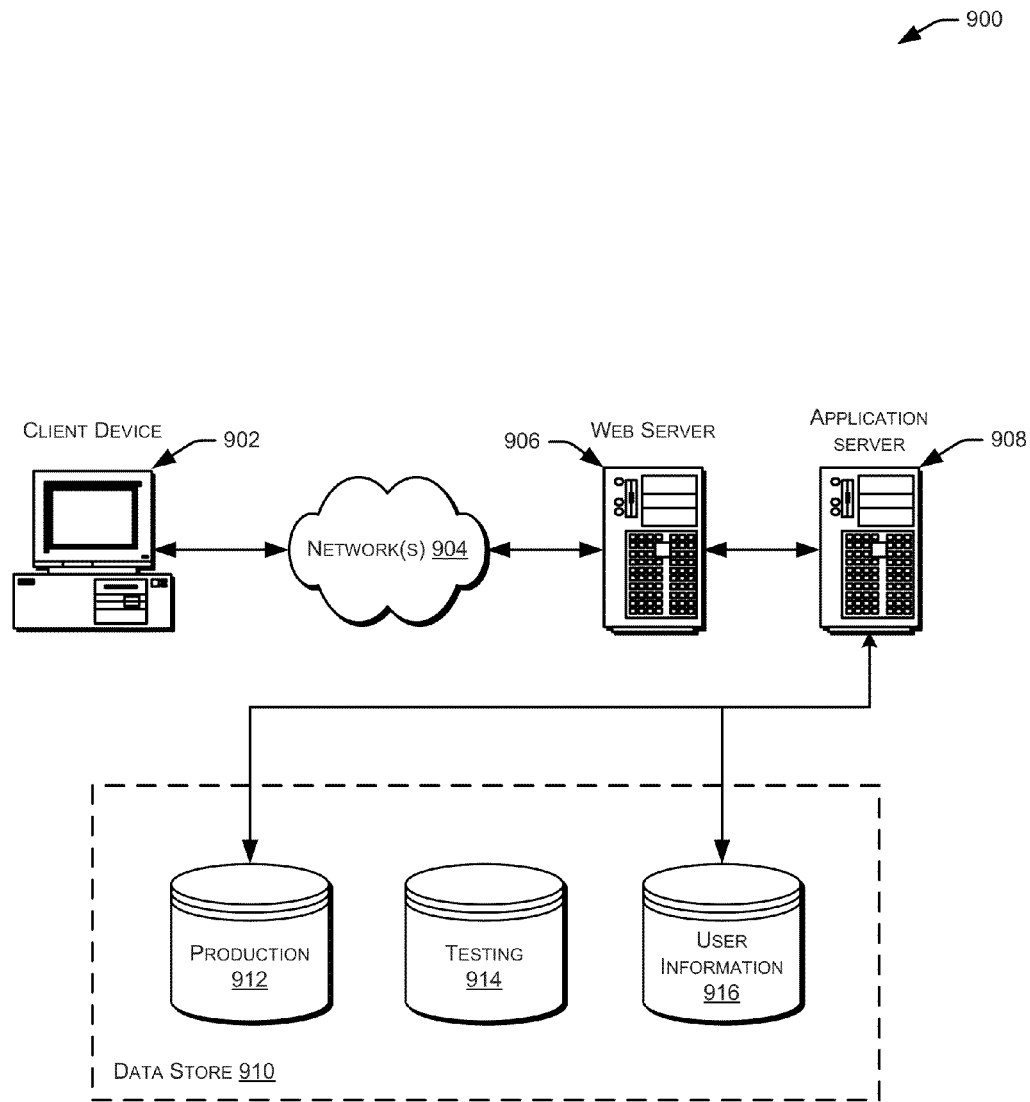
FIG. 9 illustrates an environment in which various embodiments of the tagged browsing history interface described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing browsing histories, comprising:
    receiving, by a computer system of a service, a web request from a first user;
    collecting contextual information associated with the web request;
    determining metadata associated with the web request based at least in part on the collected contextual information;
    enabling storage of the metadata;
    at least in response to a request for a graphical representation of browsing history information associated with the first user, determining, by the computer system, the browsing history information based at least in part on the metadata, the browsing history information configured to identify a relative level of browsing knowledge attained by the first user with respect to a second user of the service; and
    providing the graphical representation of the identified browsing history information via a graphical user interface to the first user, the graphical representation provided such that a first level associated with the browsing knowledge attained by the first user is provided for display adjacent to a second level associated with a second browsing knowledge attained by the second user.

2. The computer-implemented method of claim 1, wherein the contextual information includes at least one of a location, a date, a time of day, an amount of time, or a device type associated with the web request.

3. The computer-implemented method of claim 1, wherein the metadata includes at least one of user-provided text, a user-provided bookmark, a summary of the contextual information, or a machine-learned identifier associated with at least one of the user-provided text, the user-provided bookmark, or the contextual information.

4. The computer-implemented method of claim 1, wherein the browsing history information includes at least a data structure configured to graphically portray the browsing history information over time associated with the web request.

5. The computer-implemented method of claim 1, wherein the browsing history information includes at least an indication of an amount of a browsing goal associated with the web request.

6. The computer-implemented method of claim 1, wherein the relative level of the browsing knowledge is associated with one or more categories associated with the web request.

7. A computer-implemented method for managing browsing histories, comprising:
    receiving, by a computer system of a service, context information associated with a browsing session;

determining, based at least in part on the received context information, metadata associated with the browsing session;

determining, by the computer system and based at least in part on the metadata, browsing information associated with the browsing session, the browsing information configured to identify a relative level of browsing knowledge attained by the first user with respect to a second user of the service, the first user being associated with the browsing session; and responding to a user interface request based at least in part on the identified browsing information by providing a graphical representation of the relative level of browsing knowledge attained by the first user with respect to the second user.

8. The computer-implemented method of claim 7, further comprising processing web requests for a remote computing device associated with the browsing session, the context information being received from the remote computing device.

9. The computer-implemented method of claim 8, wherein the context information is based at least in part on a time or a location associated with the remote computing device.

10. The computer-implemented method of claim 7, wherein the browsing information includes at least one of an indication of an attained amount of a browsing target of the first user associated with the browsing session.

11. The computer-implemented method of claim 10, wherein responding to the user interface request includes providing search results or product recommendations based at least in part on the browsing information.

12. The computer-implemented method of claim 10, wherein responding to the user interface request includes providing a chart configured to graphically represent the browsing information over a period of time.

13. A system for managing browsing histories, comprising:
at least one memory that stores computer-executable instructions; and
at least one processor configured to access the at least one memory, wherein the at least one processor is configured to execute the computer-executable instructions to collectively at least:
determine context information associated with a web session;
associate metadata with the web session based at least in part on the context information;
identify viewing history content related to the web session based at least in part on the metadata associated with the web session, the viewing history content configured to identify a relative level of browsing knowledge attained by a first user with respect to a second user, at least the first user being associated with the web session; and
provide a graphical representation of the viewing history content at least in response to a web request, the graphical representation provided to enable rendering of the relative level of browsing knowledge attained by the first user with respect to the second user.

14. The system of claim 13, wherein determining the context information includes at least automatically identifying contextual information associated with a web request of the web session.

15. The system of claim 14, wherein the contextual information includes at least one of a date, a time, a duration, a location, or a type of content associated with the web request.

16. The system of claim 13, wherein determining the context information includes at least receiving contextual information from the first user associated with the web request of the web session.

17. The system of claim 16, wherein the contextual information includes at least a bookmark or a user-provided annotation.

18. The system of claim 13, wherein the viewing history content is further provided as a graphical representation of a browsing goal and an amount of the browsing goal that has been attained over a period of time.

19. One or more computer-readable media storing computer-executable instructions for managing browsing histories that, when executed by one or more computer systems, configure the one or more computer systems to perform operations comprising:
collecting contextual information associated with a web session;
identifying metadata associated with the web session based at least in part on the collected contextual information;
generating, based at least in part on the metadata, a browsing metric for a remote computing device associated with the web session, the browsing metric configured to identify at least a first web session characteristic to be compared with a second web session characteristic, the web session characteristic configured to identify a level of knowledge of a first user associated with a category; and
providing, to the remote computing device, a graphical representation of the comparison between the first web session characteristic and the second web session characteristic such that the level of knowledge of the first user is rendered with a second level of knowledge corresponding to a second user.

20. The one or more computer-readable media of claim 19, wherein the contextual information includes at least one of a time, a date, a type of content, a bookmark, or an annotation associated with the web session.

21. The one or more computer-readable media of claim 19, wherein identifying the metadata includes selecting at least one element of the collected contextual information.

22. The one or more computer-readable media of claim 19, wherein identifying the metadata includes generating a summary tag based at least in part on the collected contextual information.

23. The one or more computer-readable media of claim 19, wherein the level of knowledge attributed to the web session is based at least in part on an amount of time the web session spent displaying information associated with the category.

* * * * *